No. 838,116. PATENTED DEC. 11, 1906.
L. S. HOLMES.
FRUIT PICKER AND GATHERER.
APPLICATION FILED JAN. 30, 1906.

WITNESSES:
Max B. A. Doring
J. Vernon

Lyman S. Holmes INVENTOR
BY
Hensey & Gough HIS ATTORNEYS

THE NORRIS PETERS CO., WASHINGTON, D. C.

UNITED STATES PATENT OFFICE.

LYMAN S. HOLMES, OF SCHOHARIE, NEW YORK.

FRUIT PICKER AND GATHERER.

No. 838,116.  Specification of Letters Patent.  Patented Dec. 11, 1906.

Application filed January 30, 1906. Serial No. 298,627.

*To all whom it may concern:*

Be it known that I, LYMAN S. HOLMES, a citizen of the United States, residing at Schoharie, in the county of Schoharie and State of New York, have invented certain new and useful Improvements in Fruit Pickers and Gatherers, of which the following is a specification.

My invention has reference to that class of devices used for picking fruit from trees, and more particularly it relates to fruit-pickers provided with jaws for closing on the fruit and a chute or elongated bag for conveying the fruit to the operator.

The object of my invention is to provide a fruit picker and gatherer that shall be simple in construction, positive in its operation, and particularly which is capable of being sold separate from the pole on which it is to be mounted and be easily attachable to or detachable from the pole or handle.

The invention consists in the particular combination and arrangements of parts hereinafter stated in the claims.

An embodiment of my invention is illustrated in the accompanying drawings, wherein—

Figure 1:
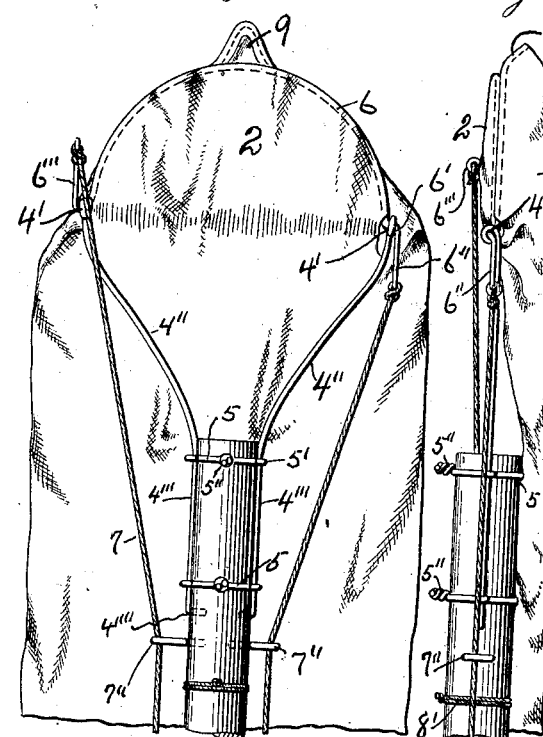
Figure 2:
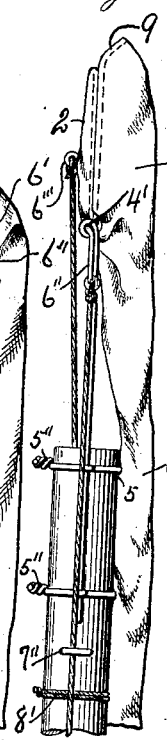
Figure 3:
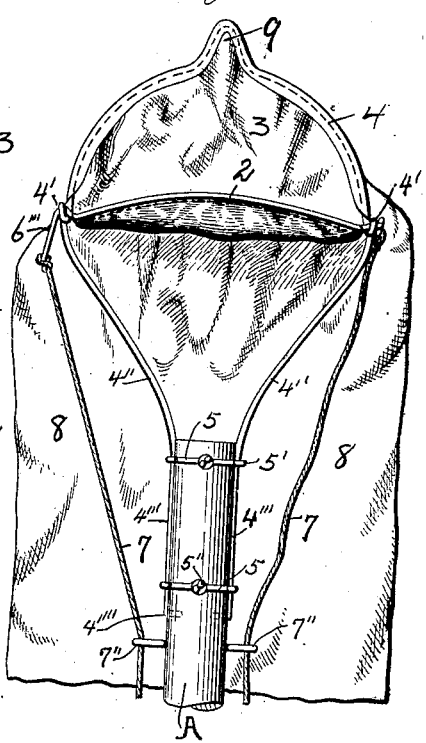
Figure 4:
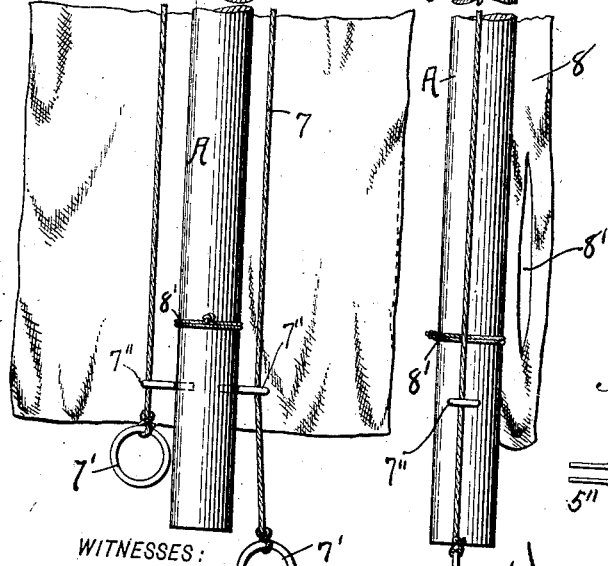
Figure 5:
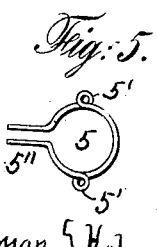

Figure 1 is a front view of my fruit-picker, the jaws being closed. Fig. 2 is a side view with the jaws closed. Fig. 3 is a front view with the jaws open. Fig. 4 is a side view of the metal framework of the jaws to show more clearly the action thereof. Fig. 5 is a detail.

In all the figures like reference-numerals designate like parts.

2 designates the front or movable jaw, and 3 the rear or fixed jaw. The fixed jaw 3 is formed by a metal rod or wire 4 of requisite stiffness, which at its upper portion is bent into an approximate semicircle, as shown in Fig. 3. The wire below the semicircle on each side is bent around to form an eye 4', and the ends of the wire are then extended downward and inward on each side toward the axis of the device, as at the portion 4''. Below the part 4'' the wires extend downwardly in a straight line, as at 4''', adapted to clasp a pole between them. The lower ends of the wires are bent inward, as at 4'''', to form points which may be driven into the said pole. In order to hold the wire loop 4 securely to the pole after it is placed thereon, I provide a number of open rings 5. (Shown in Fig. 5.) These have eyes 5', adapted to engage with the extensions 4''' of the wire 4, and are intended to be placed on said extensions before jaws and bag are shipped from the factory. These rings are open when shipped and are afterward closed and tightened around the pole by twisting the wire end 5'', as shown in Fig. 2. This forms a convenient, cheap, and strong socket for the pole end and one that may be tightened up to fit any pole.

The movable jaw 2 is composed of a semicircular metal or wire frame 6, whose ends are bent outwardly to form pivots 6', which pass through the eyes 4' of the jaw-frame 4. After passing through the eyes 4' the ends of the wire 6 are bent to form crank-arms 6'' 6'''. These project in almost opposite directions to each other, one of them, as 6'', being in the same plane with the loop 6, but the other, as 6''', being bent somewhat toward the front, so that when the jaw is closed the pull on the crank-arms will not be in plane with its pivot, and therefore that the jaw may open more readily.

At the ends of the arms 6'' 6''' are eyes to which are attached cords 7 7, carrying finger-rings 7' at their lower ends. At intervals along the cords are strung screw-eyes 7'', which are intended to be inserted into the pole when the jaw-socket is in place thereon.

8 is a chute or elongated bag open at the top, and stitched or otherwise attached at its top to the jaw-frames 3 and 4, after the manner usual in this class of devices. This chute extends downward to such a distance as would bring its bottom in convenient position with relation to the hands of the operator. It is provided on its front side with cords or wires 8', having ends designed to be wound around the pole and afterward tied or twisted, as shown in Fig. 1. Just above the lower end of the chute 8 is a slit 8'', through which the fruit may be picked out.

In order that fruit may be plucked without closing the jaws or where it is unusually refractory, I form the fixed wire-frame 4 at its apex with an open loop 9, preferably bent somewhat backwardly and adapted to be passed over the stem of the fruit to be picked, the fruit itself being within the open jaws of the picker. By then pulling down upon the device or giving it a slight turn the stem of the fruit may be easily broken or the fruit pulled off.

The operation of the device is obvious from the drawings. The bag, jaws, cords, and screw-eyes are assembled ready for application to any suitable pole. When the jaws are fastened to the pole, as shown, the screw-eyes attached, and the bag fastened to the pole, it is ready for use. The cords 7 are long enough for the rings 7' to hang convenient to the fingers of the operator. These rings and the peculiar construction of the device permit the operator to grasp the pole with both hands while operating the jaws with his fingers. By pulling down on one cord the jaws are opened, and by pulling on the other they are closed.

An advantageous feature in my invention is the backwardly-turned open loop 9. One of the difficulties with pickers having jaws is that the frame of the jaws, being made of light metal, is liable to be bent when closed on and pulling down on a fruit which holds to the stem. The loop 9, however, is easily placed over the stem. No strain then comes on the jaws to tend to open them, but only on the bent-up wire-forming loop 9, which being almost doubled on itself is much stronger than the plain semicircular portion.

Having described my invention, what I claim is—

1. In a fruit-picker, a fixed jaw formed of a semicircularly-bent wire, loops formed in said wire at diametrically opposite points on the semicircle, said jaw having downwardly-extending lateral arms adapted to be placed and engage on opposite sides of a pole, rings on said arms adapted to clasp the pole and be tightened thereon, a movable jaw formed of a semicircular frame of wire having outwardly-projecting extensions passing through the loops on the fixed jaw, said extensions being bent at right angles to the fixed jaw and in opposite directions to each other to form oppositely-projecting crank-arms, a chute whose upper end is attached to the fixed jaw above the loops thereof and to the movable jaw above the crank-arms thereof, rings attached to said chute at distances therealong adapted to be passed around a pole, cords fast to the extremities of the crank-arms and eyes for said cords having means for fastening said eyes to the said pole, substantially as described.

2. In a fruit-picker, a fixed jaw formed of a semicircularly-bent wire, loops formed in said wire at diametrically opposite points on the semicircle, an open rearwardly-turned loop formed in the wire of the fixed jaw and projecting upwardly at a point between the said loops, said jaw having downwardly-extending lateral arms adapted to be placed and engage on opposite sides of a pole, rings on said arm adapted to clasp the pole and be tightened thereon, a movable jaw formed of a semicircular frame of wire having outwardly-projecting extensions passing through the loops on the fixed jaw, said extensions being bent at right angles to the fixed jaw and in opposite directions to each other to form oppositely-projecting crank-arms, a chute whose upper end is attached to the fixed jaw above the loops thereof and to the movable jaw above the crank-arms thereof, rings attached to said chute at distances therealong adapted to be passed around the pole, cords fast to the extremities of the crank-arms and eyes for said cords having means for fastening said eyes to the said pole, substantially as described.

In testimony whereof I have signed my name to this specification, in the presence of two subscribing witnesses, this 22d day of January, 1906.

LYMAN S. HOLMES.

Witnesses:
HERBERT A. SHANLE,
CLARKE SHANLE.